(12) United States Patent
Choi

(10) Patent No.: US 6,267,832 B1
(45) Date of Patent: Jul. 31, 2001

(54) METHOD AND APPARATUS FOR AUTOMATED MANUFACTURE OF UNIT FILTERS

(75) Inventor: Kyung-Ju Choi, Jefferson County, KY (US)

(73) Assignee: AAF International, Louisville, KY (US)

(*) Notice: Subject to any disclaimer, the term of this patent is extended or adjusted under 35 U.S.C. 154(b) by 0 days.

(21) Appl. No.: 09/372,514

(22) Filed: Aug. 11, 1999

(51) Int. Cl.[7] ................................................ B32B 31/16
(52) U.S. Cl. .......................... 156/70; 156/73.1; 156/176; 156/267; 156/269; 156/290; 156/292; 156/522; 156/580.1
(58) Field of Search ..................... 156/70, 73.1, 166, 156/176, 250, 267, 269, 290, 292, 510, 522, 580.1

(56) References Cited

U.S. PATENT DOCUMENTS

| | | | |
|---|---|---|---|
| 5,215,609 | * | 6/1993 | Sanders ................................ 156/70 |
| 5,238,474 | * | 8/1993 | Kahlbaugh et al. ................. 55/320 |
| 5,846,360 | * | 12/1998 | Gil ..................................... 156/73.1 |
| 5,968,373 | * | 10/1999 | Choi ................................... 210/806 |
| 6,159,316 | * | 12/2000 | Holt et al. ......................... 156/73.1 |

* cited by examiner

Primary Examiner—James Sells
(74) Attorney, Agent, or Firm—Polster, Lieder, Woodruff & Lucchesi

(57) ABSTRACT

A method and apparatus for continuously manufacturing filter units; each unit including a flow-through filter medium support frame with at least one sheet of filter medium extending across the flow-through opening of each unit with the edges thereof welded to the peripheral side edges of the unit frame.

27 Claims, 3 Drawing Sheets

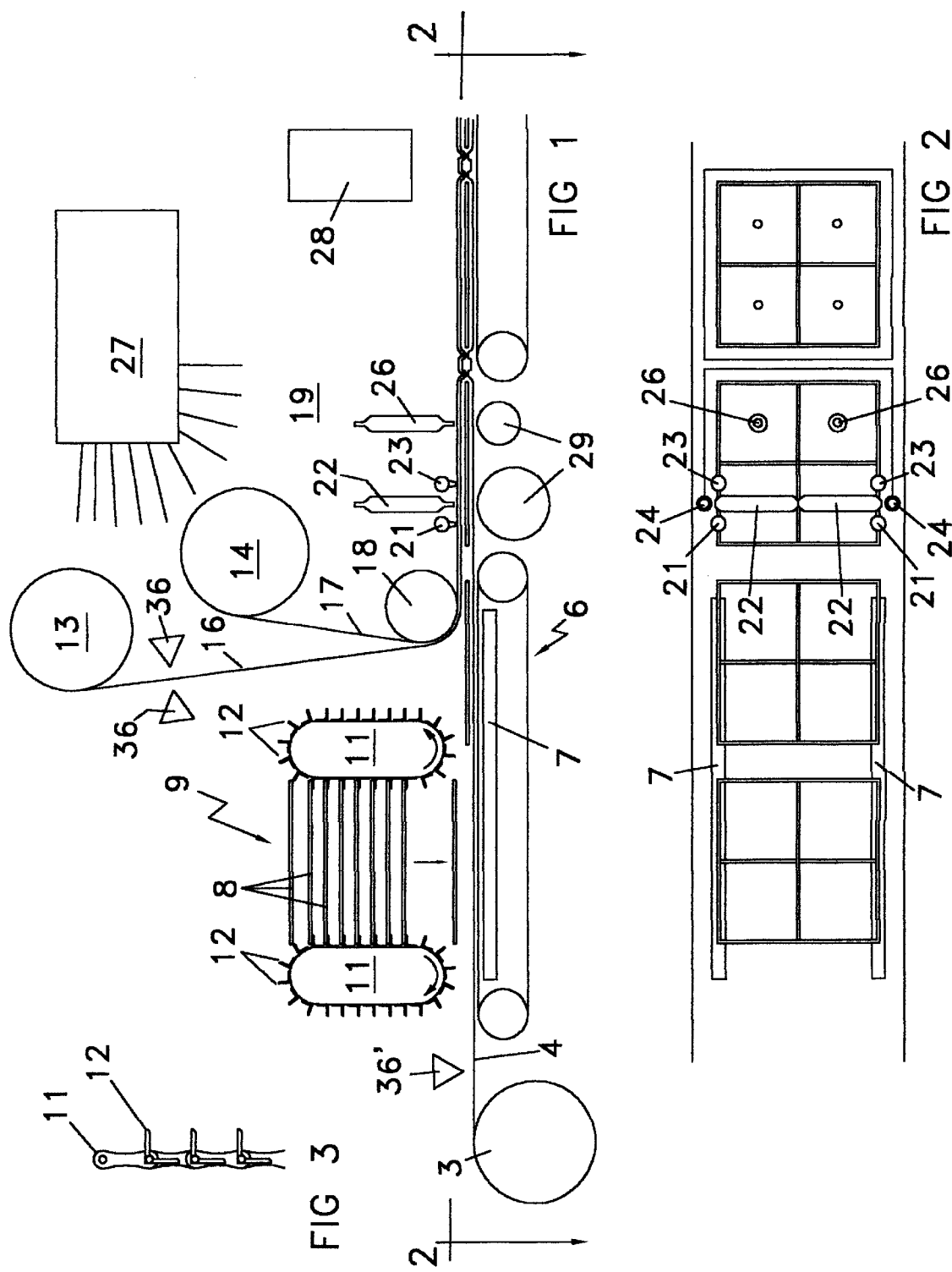

METHOD AND APPARATUS FOR AUTOMATED MANUFACTURE OF UNIT FILTERS

BACKGROUND OF THE INVENTION

The present invention relates to framed flow-through media containing unit filters and more particularly to a method and apparatus for the automated manufacture of such unit filters.

A number of types of flow-through unit filters which include flow-through frame members with filter media extending across the flow-through frame opening for filtering fluid filters are generally well known in the art, as are the methods and apparatus for manufacturing the same. Automated filter unit manufacture also is known in the art, attention being directed to U.S. Pat. No. 5,215,609, issued to Scott L. Sanders on Jun. 1, 1993, wherein a pocket type unit filter with a frame inserted into the pocket is automatically produced with select pocket seams thereof being ultrasonically welded during the continuous automated manufacturing process, this patent acknowledging that the use of ultrasonic welding techniques are generally well known in fabric production.

The present invention provides a new, useful and unobvious automated manufacturing method and apparatus for manufacturing unit flow-through fluid filters which are of a type particularly useful for treating gas flow streams such as air to remove particulate matter therefrom. The present invention provides a unique way for assembling unit flow-through filter frames to one or more sheets of continuously fed filter media, placing and holding the frames in preselected position and for a preselected distance together with the one or more continuously moving sheet or sheets of filter media and then ultrasonically welding the continuously moving frame and media assembly together in tight fashion along the unit frame perimeters prior to the automatic severance of each media covered flow-through unit frame from the continuous process arrangement.

The present invention accomplished the unique process with a unique arrangement which is straight-forward and economical, requiring a minimum of space, operating steps and operational parts and at the same time assuring positive holding and positioning on unit frames assembled in a spaced continuous manner with one or more tightly welded or fused sheets of filter media. Further, the present invention recognizes and utilizes preselected and treated flow-through materials so as to provide for the unique holding and aligning of the frames in assembled relation with the filter media and to subsequently detect and ultrasonically weld the assembled filter media covered unit frames along the entire frame periphery. In addition, the present invention provides for a novel manner of treating and spacing filter medium in a unit frame, if so elected to do so.

It is to be understood that various other features of the present invention will become obvious to one skilled in the art upon reading the disclosure set forth herein.

SUMMARY OF THE INVENTION

More particularly, the present invention provides for automatedly manufacturing unit filters, each unit including a frame defining opening with filter media extending thereacross comprising: continuously feeding at lease one preselectively sized first sheet of filter medium from a supply zone to a correspondingly sized unit flow-through frame supply zone, the frame supply zone including stacked unit frames with each unit frame defining a flow-through opening and cooperative unit frame holding and alignment means, the stacked unit frames and holding and alignment means being further cooperative with the continuously fed sheet of filter medium to selectively hold and align and position each unit frame into cooperatively assembled relation with the continuously fed sheet of filter medium for a preselected distance so that the filter medium extends across the flow-through opening of each of the spaced flow-through unit frames; continuously feeding the aligned and assembled flow-through frames and filter media to a sealing zone to seal the filter media to the periphery of each of the assembled unit flow-through frames; and; removing the assembled filter media sealed flow-through frames from the continuous process arrangement.

In addition, the present invention provides for unique apparatus for manufacturing unit filters comprising: a motorized upstream supply zone feed means to feed filter medium as a continuous filter sheet or layer from a supply roll disposed therein to a downstream framing zone; a filter framed stacker means disposed in the downstream framing zone to sequentially feed flow-through unit filter frames to one face of the continuous filter sheet or layer; a filter frame holding and alignment means to hold and align each of the flow-through unit filter frames on the filter medium sheet or layer in a preselected, spaced position on the filter medium sheet or layer for a preselected distance while covering the flow-through opening; sonic sealing means to seal the filter medium sheet or layer to the surrounding peripheral edges of each filter unit frame; and, control means to sequence successive operation of the sheet or layer feed means, stacker means, holding and alignment means and sealing means.

In addition, the present invention provides for the unique selection of magnetizable frame units to enhance the magnetic holding and alignment of such frame units for assembly operations and for the further detection and sonic welding of the assembled units.

It is to be understood that various changes can be made by one skilled in the art in one or more of the several steps of the novel method disclosed herein and in one or more of the several parts of the novel apparatus disclosed herein without departing from the scope or spirit of the present invention.

BRIEF DESCRIPTION OF THE DRAWINGS

Referring to the drawings, which schematically disclose one advantageous embodiment of the novel apparatus to carry out the novel steps of the present invention:

FIG. 1 is a schematic elevational side view of the inventive apparatus utilized to accomplish the several inventive automated steps of the novel method of the present invention;

FIG. 2 is a view of a portion of the schematically disclosed apparatus of FIG. 1, (taken in a horizontal plane through line 2—2 of FIG. 1) more fully disclosing the spaced pair of magnetized frame rails for holding and aligning unit flow-through frames and the detecting and sealing arrangement of FIG. 1;

FIG. 3 is an enlarged side view of a portion of one flight of the endless conveyor chain disclosed in FIG. 1;

DETAILED DESCRIPTION OF THE INVENTION

Figure 4:
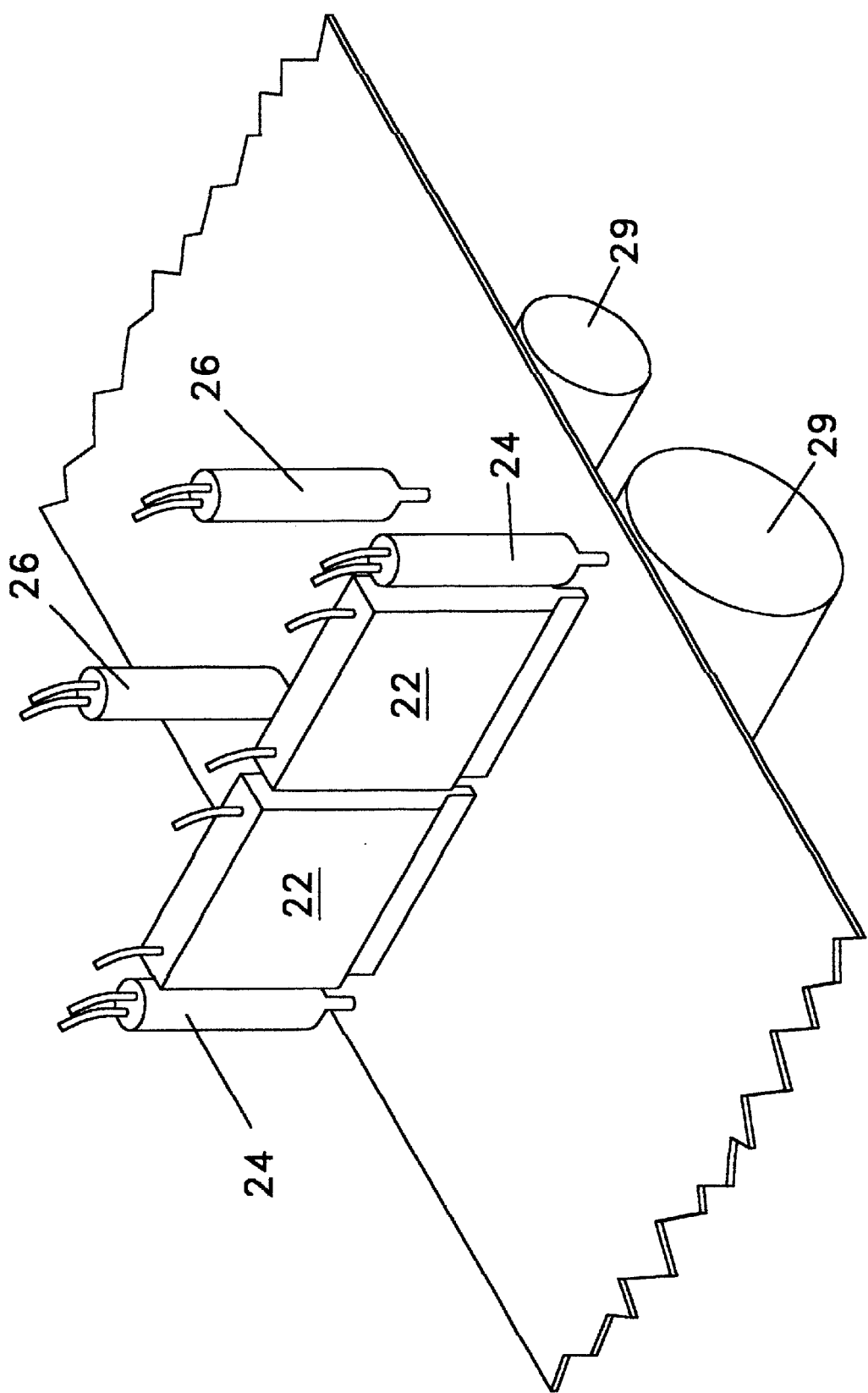
FIG. 4 is an enlarged perspective view of a portion of the sealing arrangement of FIG. 2.

As can be seen in the drawings, the inventive overall apparatus 2 for continuously manufacturing and assembling flow-through unit filter frames with preselected filter medium covering the flow-through openings includes a first supply roll 3 which can be either motor driven or idle and can be arranged to supply a suitably sized continuously fed sheet or layer of filter medium 4 to a motor driven endless conveyor belt 6. Advantageously, any one of several known filter media sheets or layers can be utilized, such as a polyester fibrous material, the filter sheets or layers being of preselected thickness and pore density. It is to be understood that the several power motors utilized herein to drive or operate filter media supply rolls, conveyor chains and detecting and sonic equipment are not disclosed herein but are operated sequentially through a central control center also shown schematically and described more fully hereinafter.

As can be seen in FIGS. 1–3 of the drawings, positioned below the upper flight of endless conveyor belt 6 is a pair of longitudinally extending, spaced, magnetized rails 7. It is to be understood that the number of magnetized units can be varied in accordance with the magnetic materials and geometries involved. The longitudinally extending, spaced, magnetized pair of rails 7 as herein disclosed serve to hold and align unit flow-through frame members 8 assembled on the upper face of filter medium 4 for a preselected distance as the assembled filter medium 4 and flow-through frames 8 are continuously moved along to an adjacent operating station.

To assemble frame members 8 to filter medium 4, a continuously motor operated stacker arrangement 9 is positioned and centered in spaced relation above the spaced, magnetized rail pair 7 and above the horizontal path of the continuously moved filter medium sheet 4. Stacker arrangement 9 includes two vertically extending, spaced, motor driven, continuous endless conveyor belts 11 (FIG. 1). Each endless belt 11 is provided with the plurality of oppositely aligned and spaced pivotal support members 12 (FIG. 3) which are of right angle cross-section with the legs thereof being sized to support in vertically spaced and stacked relation opposed side edges of each horizontally extending stacked frame member 8. When the lower portions of opposed flights of opposed vertically extending conveyors 11 are reached, opposed support members 12 pivot by gravity to release the lowest of the horizontally extending frame members 8 from the lower portions of the opposed conveyors 11 unto the preselectively sized upper face of continuously moving filter medium sheet or layer 4. Advantageously, and in accordance with one feature of the present invention, flow-through frame members 8 are of magnetizable material such as steel so that magnetized rails 7 hold and align each frame member 8 for a preselected distance in assembled relation to the upper face of filter medium sheet or layer 4. It is to be understood that other mechanically and hydraulically-electrically operated holding and aligning structure could be utilized in the event frame members 8 are made of non-magnetizable material but that the spaced, magnetized rail and magnetizable frame member feature of the present invention presents a most straightforward and economical assembly structure.

In accordance with still another advantageous feature of the present invention, second and third spaced filter media supply rolls 13 and 14 respectively, each having a horizontally disposed motor driven roll axis can be positioned in spaced relation above the first continuously fed filter medium sheet 4 and after the aforedescribed frame stacker arrangement 9 and the vertically aligned holder and alignment spaced magnetized rail pair 7. Rolls 13 and 14 can be arranged to respectively feed appropriately sized layers of filter media 16 and 17 of preselected thickness, porosity and fiber sizes over a lower sheet collector or nip roll 18, which can be either an idler roll or which can be selectively motor driven. The assembled filter media layers 16 and 17 are passed horizontally over spaced frame members 8 to sandwich the spaced frame members 8 between horizontal filter medium sheet or layer 4 and collected horizontal filter media layers 16 and 17. It is to be understood that all of the filter media layerss are appropriately sized with respect to the flow-through frame members 8 to completely cover the flow-through opening of each unit frame member. Further, it is to be understood that the filter media layer roll arrangement above and below the assembled frame members can be varied in number and position in accordance with filter performance design factors.

In accordance with still another feature of the present invention, the assembled filter media and spaced unit frames are then horizontally moved to a detecting and sonic sealing welding arrangement 19 positioned downstream of filter media supply rolls 13 and 14, the detecting and sonic sealing arrangement 19 includes a first frame detector 21 which can be magnetically actuated if spaced frame members 8 are of metal, detector 21 actuating and deactivating longitudinally extending breadth sonic horns 22, which extends across the breadth of the frame and filter media assembly, to sonically weld together the leading breadth edge of each unit frame and media assembly, the sonic horns 22 then be moved out of welding or fusing position. At the same time, the opposed edge sonic horns 24 located at opposite ends of breadth sonic horns 22 are activated to continuously seal opposed side edges of each unit frame assembly. A second detector 23 serves to again actuate and deactuate breadth sonic horns 22 when the trailing edge of each frame assembly passes therebelow to sonically weld or fuse together the opposed trailing breadth edge of each unit frame and media assembly before sonic horns 22 are again moved out of welding or fusing position. It is to be understood that the pair of opposed edge sealing sonic horns 24 positioned adjacent opposed extremities of longitudinally extending breadth sonic horns 22 and which serve to simultaneously and continuously weld or fuse the opposed side edges of each of the unit frame and media assemblies deactivate when the opposed side edges of each assembled frame unit has been sealed. In like manner, a pair of spaced sonic horns 26 positioned inwardly of the opposed side edges of each frame assembly serve to weld the facing media 4, 16 and 17 together in tightened relation within each flow-through opening of each frame member 8. It is to be understood that the aforedescribed sonic welding is appropriately timed to assure a tight fitting relation between frame and media when so desired. Further, inward sonic horns 26 can be eliminated, if so desired to allow a preselected spacing between filter media layers, based on particulates in the fluid stream to be treated and the porosity and thickness of the filter media layers—all in accordance with now pending and soon to issue patent application Ser. No. 08/996,222, filed on Dec. 22, 1997 by Kyung-Ju Choi. As can be seen in FIG. 1, suitable sequencing controls located in central control unit 27 serve to electrically—electronically sequentially control operations of the several units aforedescribed.

In addition, the control unit 27 can also serve to control an assembly severing unit 28 which can be of either laser operated or a mechanical shear to separate each assembled flow-through filter unit from the continuously moving unit filter assembly line. Further, as can be seen in FIG. 1 of the drawings, appropriately sized and spaced idler anvils 29 can be provided below detecting and sonic sealing arrangement 19 to insure back-up for the tight fitting sonic welding assembly of the filter media sheets 4, 16 and 17 to each unit frame member 8. It is to be understood that the relative positioning and placement of the media feed rolls, the sonic detectors, sonic horns and anvils therefor can be varied by one skilled in the art in accordance with manufacturing exigencies without departing from the disclosed invention.

In accordance with the novel and inventive method of the present invention for manufacturing unit filters with each unit including a frame defining flow-through opening with filter media extending thereacross to cover the flow-through opening, the several steps of the invention comprise: continuously feeding in a horizontal plane a first sheet or layer 4 of preselected air filter medium from a supply roll 3 positioned in a first supply zone to a correspondingly sized unit flow-through frame supply zone 9, the frame supply zone 9 including spaced vertically stacked and spaced, horizontally, substantially rectangular, disposed unit frames 8, which advantageously can be of magnetizable metal material with each frame defining a substantially rectangular opening, the horizontally extending unit frames 8 being stacked in spaced relation in a vertically extending column with the opposed side edges of each unit frame 8 being mounted on spaced opposed pivotal support members 12, which are pivotally attached to spaced vertically extending endless conveyors 11 with the support members 12 adapted to pivotally release at the lower corresponding ends thereof each unit frame 8 in preselectively spaced, cooperatively assembled, horizontal relation unto the upper face of the horizontal layer of filter medium 4 so that the filter medium layer 4 extends below, across and covers the lower portion of the flow-through opening of each of the unit spaced frame members 8. A magnetized holding and alignment zone, aligned with and below the layer of filter medium 4 serves to hold and align the spaced frames 8 deposited on the upper face of the continuously fed, horizontally disposed filter medium layer 4 for a preselected distance. Second and third filter media sheets 13 and 14 disposed respectively in second and third supply zones can then be introduced horizontally in a collective, continuous, facing relation above spaced frames 8 assembled on the upper face of continuously moving filter media layer 4 to also completely cover the flow-through openings of spaced unit frame members 8. As above discussed, the filter media layers 13 and 14, as well as filter medium layer sheet 4 can be of preselected thickness and porosity with spacing therebetween as determined by the thickness of frame members 8, being such as to allow particulate distribution in accordance with the inventive structure disclosed in U.S. patent application No. 08/996, 222, filed on Dec. 22, 1997 by Kyung-Ju Choi. The assembled, substantially rectangular flow-through unit frames 8 are then passed to a detecting and welding zone 19 with the sandwiching first filter medium layer 4 adjacent one face of each unit flow-through frame 8, covering the flow-through opening of such face, and the second and third media layers 16 and 17 adjacent the other face of each flow-through unit frame 8 covering such flow-through opening of each unit 8 along such other face of the unit. When the leading edge of each spaced frame is detected by a first detector 21, breadth sonic horns 22 and side edge sonic horns 24 are sequentially activated and deactivated to tightly seal each frame assembly along the leading frame breadth and side edges of a frame assembly before deactivating.

When the trailing edge of each frame assembly is detected by second detector 23, breadth sonic horns 22 are again activated and deactivated to tightly seal the trailing breadth of each assembled frame unit. If it is elected not to space the covering filter media 4, 16 and 17 for each frame, the inwardly positioned spaced sonic horns 26 can be appropriately activated and deactivated to tightly seal the filter media sheets or layers together within each frame member 8. It is to be understood that the sequencing and timing of the units is effected by an electrical-electronic control unit 27 which can sequentially control the several mechanisms in each of the supply, detecting and welding zones as aforedescribed. Control unit 27 further serves to sequence a severing mechanism 28 when each sealed filter unit assembly is passed to a severing zone.

Figure 5:
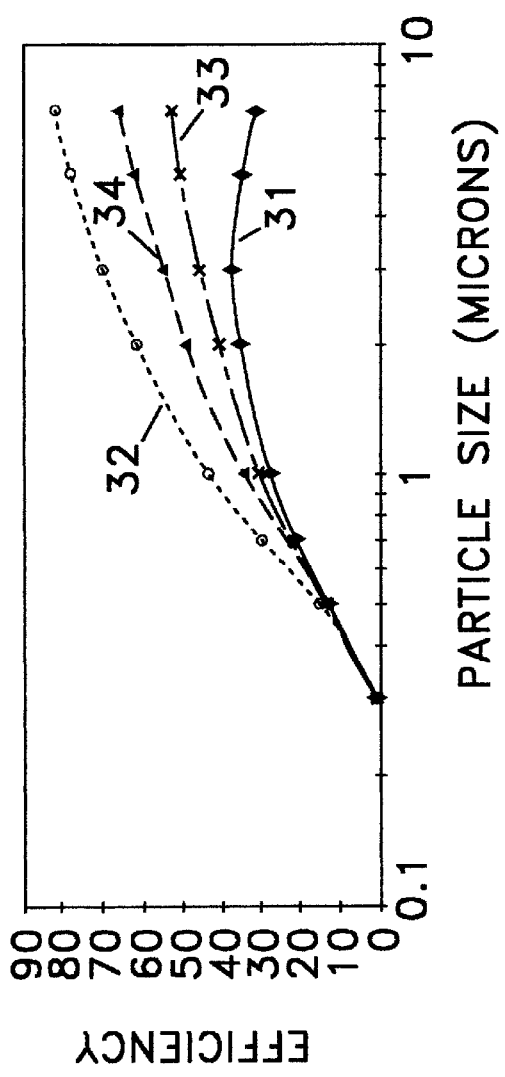
FIG. 5 is a graph plotting filtration efficiency against particle size for three differently oil treated filter media and one untreated filter medium; and, FIG. 6 is a graph plotting initial filter medium resistance against fluid velocity for an oil treated filter medium and one which is untreated.
Figure 6:
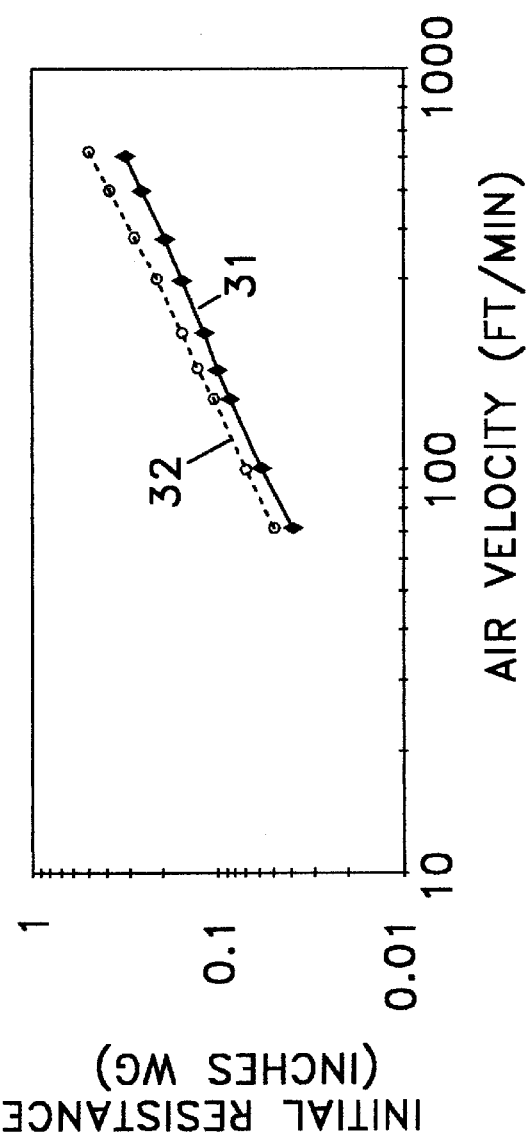

In accordance with another feature of the present invention it is recognized that particles lose energy in order to be caught on filter media at low fluid velocities. At high velocities, larger particles, generally larger than 0.3 micron diameters, bounce through the filter media since their energies fail to fully dissipate when contacting filter media. It is further recognized that by oil coated filter medium, particle adhesion greatly enhances the rate of energy dissipation, minimizing particle bouncing at the point of filter media contact. The recognition of this feature by the present invention has particular application herein and also in copending patent application Ser. No. 09/236,207, filed Jan. 23, 1999, abandoned by Kyung-Ju Choi. Referring to FIGS. 5 and 6 of the drawings which compares filtration performance of different levels of oil treated filter media with untreated filter medium, it can be seen in FIG. 5, that curve 31, represented by black diamond marks to illustrate untreated filter medium shows the lowest filtration efficiency with decreasing efficiency at particle sizes of more than two (2) microns diameter indicating particle bouncing. The curve 32, reprsented by unfilled circular marks, illustrates identical filter medium treated with fifteen (15) grams of preselected oil, such as disclosed in application Ser. No. 09/236,207 above, and shows the highest efficiency of all with curve 33, represented by cross marks and curve 34 represented by filled triangular marks treated with five (5) and ten (10) grams of such preselected oil respectively, illustrating identical filter medium treated with such identical preselected oil. Thus, FIG. 5 clearly illustrates that filtration efficiency increases with the increase of preselected oil amounts coated on identical filter medium.

Referring particularly to FIG. 6 of the drawings, wherein initial resistance (measured in inches—water gauge) is plotted against fluid velocity in feet per minute (ft/min), it can be seen that three is less than zero point one (0.1) inches of water gauge difference in resistance at fluid velocities of five hundred (500) feet per minute between identical medias for curves 32 and 31 respectively which are respectively treated as above, with fifteen grams of preselected oil per square feet for curve 32 and without oil respectively for curve 31.

Referring to FIG. 1 of the drawings, oil applicators 36 and 36' represented by inverted triangular markings, advantageously can be positioned downstream the first filter medium supply roll 3—as shown by reference numeral 36—or/and on opposite faces of filter medium 16—as shown by reference numerals 36, so that a preselected oil treatment can be applied to the upper face of filter medium layer 4 with the oil treated faces being sandwiched between medium layers 4 and collected media layers 16 and 17 so as to minimize physical contact with the treating oil when assembled as a unit filter media frame. It is to be understood that other oil treatment locations can be utilized, if so desired,—depending upon the layers of filter media involved.

The invention claimed is:

1. A process for automatedly manufacturing unit fluid filters, each unit including a frame defining opening with filter medium extending thereacross comprising: continuously feeding at least one preselectively sized first layer of filter medium from a supply zone to a correspondingly sized unit flow-through frame supply zone, said frame supply zone including stacked unit frames with each unit frame defining a flow-through opening, said frame supply zone further including cooperative unit frame holding and alignment means, said stacked unit frames and said holding and alignment means serving to selectively hold, align and position each unit frame into cooperatively assembled relation with said continuously fed layer of filter medium so that said layer of filter medium extends across said flow-through opening of each of said spaced flow-through frames, continuously feeding said aligned and assembled flow-through unit frames and filter medium layer to a sealing zone to seal said filter medium to the periphery of each of said assembled unit flow-through frames; and, separating each of said assembled filter medium sealed flow-through frames from said continuous process.

2. The automated unit filter process of claim 1, wherein said stacked unit frames are positioned in stacked, spaced, successively aligned relation with each frame being successively released in cooperative relation along one face of said continuously fed, preselectively sized sheet of filter medium.

3. The automated unit filter process of claim 2, wherein spaced endless conveyor means having opposed aligned pivotal frame edge supports are utilized to successively release each of said frames in cooperative relation to one face of said sheet of filter medium.

4. The automated unit filter process of claim 1, wherein said unit filter frames are of magnetically responsive material and said unit frame holding and alignment means comprise at least one preselectively positioned magnetized holding member adjacent said continuously fed sheet of filter medium to selectively hold, align and position each unit frame into assembled spaced relation unto said filter medium layer.

5. The automated unit filter process of claim 4, wherein said magnetized holding and aligning member comprises at least one pair of spaced magnetized opposed rail members selectively positioned below said continuously fed layer of filter medium to hold opposed side edges of each unit filter frame in held position for a preselected distance of feed.

6. The automated unit filter process of claim 1, wherein said sealing zone includes sonic sealing means arranged to seal said continuously fed filter medium layer to the edges of each of said spaced unit flow-through filter frames.

7. The automated unit filter process of claim 6, wherein said sonic sealing means includes a pair of movable sonic members arranged to seal along the opposed peripheral side edges of each of said unit filter frames and at least one longitudinally extending movable sonic member arranged to seal along opposed peripheral breadths between opposed edges of each of said unit filter frames.

8. The automated unit filter process of claim 1, wherein at least one second additional preselectively sized layer of filter medium is fed from a second supply zone after said flow-through unit frames are placed into spaced cooperatively assembled relation with said first layer of filter medium to sandwich said unit frames therebetween before sealing in said sealing zone.

9. The automated unit filter process of claim 8, wherein said additional filter medium layer is spaced from said first filter medium layer a preselected distance in accordance with the layer densities, fiber sizes, porosities and particulate distribution of a fluid stream to be treated.

10. The automated unit filter process of claim 8, wherein a preselected oil amount is applied between said layers of filter media.

11. The automated unit filter process of claim 10, wherein said preselected oil amount advantageously is fifteen (15) grams per square foot.

12. The unit filter process of claim 1, and detector means cooperative with said sealing zone to selectively detect and to activate and deactivate said sealing zone when said assembled frame and filter media are passed thereto.

13. A process for automatedly manufacturing unit air filters, each unit including a frame defining an opening with filter media extending thereacross comprising: continuously feeding in a horizontal plane a first preselected layer of air filter medium from a supply roll positioned in a first supply zone to an oil treatment zone to apply a preselected amount of a preselected oil to the upper face of said filter medium layer and then feeding said filter medium layer to a correspondingly sized unit flow-through frame supply zone, said frame supply zone including spaced vertically stacked, horizontally disposed, substantially rectangular unit frames of magnetizable metal with each frame defining a substantially rectangular opening, said frame supply zone further including frame holding alignment and spacer means comprised of spaced aligned, vertically extending endless chain conveyors having spaced opposed sets of pivotally mounted, spaced frame supports adapted to pivotally release at the corresponding conveyor chain ends thereof said unit frames in spaced, cooperatively assembled horizontal relation unto the upper face of said continuously fed horizontal layer of filter medium so that said filter medium layer extends below, across and covers the lower portion of said flow-through opening of each of said spaced flow-through unit frames which are assembled with said continuously and horizontally fed filter medium layer; magnetically positioning and holding opposed side edges of each of said magnetizable unit frames in spaced horizontal position on said continuously, horizontally fed, oil treated first filter medium layer for a preselected distance with a pair of magnetized rails positioned below said oil treated filter medium layer; introducing at least a second continuously fed preselected air filter medium layer from at least a second supply roll located respectively in said second supply zone positioned above said continuously and horizontally fed first oil treated filter medium layer with said unit frames horizontally positioned in spaced relation thereon so as to extend above, across and cover the upper portion of said flow-through opening of each of said spaced flow-through unit frames; passing each of said substantially rectangular frames assembled with said first and second filter mediums to a sealing zone; detecting the leading edge of each assembled filter unit as said filter unit filter enters said sealing zone to activate and deactivate sonic sealing means to continuously fuse opposed side edges of each of said filter mediums to each of said unit filter frames; detecting the trailing edge of each said filter units when said side edges are fused to activate and deactivate sonic sealing means to sonically fuse across the opposed breadths of each unit; and, passing said sealed units to a severing zone to severe each assembled and sonically fused frame unit.

14. The process of automatedly manufacturing unit filters of claim 13, wherein a third layer of filter medium from a third supply roll located respectively in a third supply zone is fed to be cooperative with said second supply zone and oil treatment is alternatively applied to opposed faces of said second layer of filter medium.

15. The process of automatedly manufacturing unit filters of claim 13, wherein each step of said process is sequentially controlled from a central control zone.

16. Apparatus for automatedly manufacturing unit filters comprising: an upstream supply zone feed means to feed filter medium as a continuous filter medium layer from a supply roll disposed therein to a downstream framing zone; a filter frame stacker means disposed in said downstream framing zone to sequentially feed flow-through unit filter frames to one face of said continuous filter medium layer; a filter frame holding and alignment means to hold and align each of said flow-through unit filter frames on said filter medium layer in a preselected spaced position on said filter medium layer for a preselected distance while covering said flow-through frame opening; detecting and activated and deactivated sonic sealing means to seal said filter medium layer to the surrounding peripheral edges of each filter unit frame; and, control means to sequence successive operation of said filter layer feed means, stacker means, holding and alignment means and detecting and sonic sealing means.

17. The apparatus for automatedly manufacturing unit filters of claim 16, said filter frame stacker mean including spaced, parallel, continuous conveyor belts having opposed and aligned, spaced support members sized to support in spaced relation each of a preselected number of filter unit frames and to automatically release by gravity each of said filter frames from said support members adjacent the lower portions of opposed flights of said spaced continuous conveyor belts.

18. The apparatus for automatedly manufacturing unit filters of claim 16, said filter frame holding and alignment means including magnetized members positioned to hold magnetizable metallic unit frame members, said magnetized members being of a preselected length to align and hold said unit frames for a preselected distance.

19. The apparatus for automatedly manufacturing unit filters of claim 16, said sonic sealing means including detectors and sonic horns positioned and operable to selectively fuse seal the opposed side edges and breadths of each unit filter frame and the filter medium layers associated therewith.

20. Apparatus for automatedly manufacturing unit filter comprising: a first motor driven supply roll with a horizontally disposed roll axis to feed a preselected continuous filter medium layer in a substantially horizontal plane to a downstream oil treatment assembly to apply a preselected oil in preselected amounts to the upper face of said filter medium layer and then to a filter medium frame assembly line, said frame assembly line successively including a vertically extending frame stacker member with unit frame holder and alignment members positioned therebelow; said stacker member comprised of spaced, parallel, vertically extending continuous belts, each belt having spaced right angle support members pivotally mounted thereto to provide opposed and aligned spaced pivotal support members sized to support in spaced, vertically stacked relation a preselected number of magnetizable metallic unit flow-through frame members and to pivotally release by gravity each of said frames from said pivotal right angle support members adjacent the lower portions of opposed flights of said continuous belts in horizontal position unto the upper face of said first continuous filter medium layer; said unit frame holder and alignment members including spaced, parallel magnetized rails of preselected length positioned below said first continuous filter medium layer to hold each of said magnetized unit frame members in a preselected position for a preselected distance; downstream second and third motor driven filter medium supply rolls each having a horizontally disposed roll axis positioned above said first continuous filter medium layer and downstream said frame stacker and holder and alignment members, said second and third filter medium supply rolls having associated therewith a horizontally disposed collector roll which combines said second and third continuous filter medium layers to feed said layers horizontally over said unit frames assembled on said first continuous filter medium layer; detecting and sonic sealing welding members positioned downstream said second and third motor driven filter media rolls, including a first metallic detector to detect the leading edge of a unit frame, a pair of spaced first sonic horns to be activated and deactivated by said first metallic detector to continuously seal the opposed side edges of said first, second and third filter mediums to each unit frame and to activate and deactivate a second sonic horn lineally extend transverse the width of said filter media to seal opposed breadths of said first, second and third filter mediums to opposed breadths of each filter media frame unit and a successive second metal detector to activate and deactivate a second pair of sonic horns spaced inwardly of the side edges of said filter media to seal the first, second and third filter medium layers together within surrounding frame areas defined by each unit metallic frame; control means to successively activate said first roll motor, said spaced endless stack conveyors, said second and third roll motors and said sonic members and detectors; and, a severing member downstream of said detecting and sonic welding members, said severing member also being successively activated by said control means to sever each media assembled filter unit.

21. The unit filter process of claim 13, including applying a preselected amount by weight of a preselected oil to at least one face of a layer of said filter medium to increase filtration efficiency without substantially affecting flow resistance of a fluid stream to be treated.

22. In the process of claim 21, wherein said preselected oil by weight is in the approximate range of zero point three (0.3) to thirty (30) grams per square foot of filter medium treated.

23. In the process of claim 21, wherein said preselected oil is so applied as to be sandwiched between two filter medium layers.

24. A filter frame stacker comprising: spaced, opposed continuous frame support conveyor belts having opposed and aligned spaced support apparatus sized to support in spaced relation thereon in spaced relation filter unit frame members; and means to automatically release each of said supporter frames from said support members sequentially.

25. The filter frame stacker of claim 24, said opposed support apparatus being pivotally mounted on said spaced, opposed continuous frame support conveyor belts to sequentially release by gravity each of said filter frames from said support apparatus adjacent the lower portions of opposed flights of said spaced opposed continuous frames support conveyor belts.

26. The filter frame stacker of claim 24, and a mobile conveyor associated with said filter frame stacker to receive each of said frames, said mobile conveyor including positioning and holding means to position said frames thereon as they are received from said stacker.

27. The filter frame stacker of claim 26, said positioning and holding means being magnetizable to cooperate with magnetic responsive unit frames.

* * * * *